(12) United States Patent
Abusamra et al.

(10) Patent No.: US 7,727,111 B2
(45) Date of Patent: Jun. 1, 2010

(54) VEHICLE DRIVELINE CONTROL INCLUDING OPEN CLUTCH INDICATOR

(75) Inventors: Muneer Abusamra, Southern Pines, NC (US); Ronald Peter Muetzel, Pinehurst, NC (US); James Henry Devore, Laurinburg, NC (US)

(73) Assignee: ZF Meritor, LLC, Laurinburg, NC (US)

( * ) Notice: Subject to any disclaimer, the term of this patent is extended or adjusted under 35 U.S.C. 154(b) by 1435 days.

(21) Appl. No.: 10/308,966

(22) Filed: Dec. 3, 2002

(65) Prior Publication Data

US 2004/0106495 A1 Jun. 3, 2004

(51) Int. Cl.
*B60W 10/00* (2006.01)

(52) U.S. Cl. .............. 477/78; 477/79; 477/83

(58) Field of Classification Search ........... 477/77, 477/78, 83, 84, 85, 90, 91, 110, 906, 79; 192/30 W, 98, 3.51, 3.63; 701/64; 340/438, 340/453, 456; 74/335, 336 R, 339
See application file for complete search history.

(56) References Cited

U.S. PATENT DOCUMENTS

| | | | | | |
|---|---|---|---|---|---|
| 4,340,133 | A | * | 7/1982 | Blersch | 192/30 W |
| 4,825,993 | A | * | 5/1989 | Kurihara et al. | 477/80 |
| 4,888,577 | A | * | 12/1989 | Dunkley et al. | 340/461 |
| 4,965,730 | A | * | 10/1990 | Kurihara et al. | 701/112 |
| 5,020,361 | A | * | 6/1991 | Malecki et al. | 73/118.1 |
| 5,064,039 | A | * | 11/1991 | Otsuka et al. | 477/86 |
| 5,081,588 | A | * | 1/1992 | Holmes et al. | 701/52 |
| 5,184,301 | A | * | 2/1993 | Stasell | 701/110 |
| 5,984,828 | A | * | 11/1999 | Huber | 477/78 |
| 6,099,435 | A | * | 8/2000 | Halene et al. | 477/62 |
| 6,145,398 | A | * | 11/2000 | Bansbach et al. | 74/335 |
| 6,145,399 | A | * | 11/2000 | Bockmann et al. | 74/335 |
| 6,148,975 | A | * | 11/2000 | Shih | 192/3.62 |
| 6,151,978 | A | * | 11/2000 | Huber | 74/336 R |
| 6,167,996 | B1 | * | 1/2001 | Huber et al. | 192/30 W |
| 6,227,999 | B1 | * | 5/2001 | Wheeler | 477/174 |
| 6,494,810 | B1 | * | 12/2002 | Mack et al. | 477/174 |
| 6,641,505 | B2 | * | 11/2003 | Sayman et al. | 477/177 |
| 6,774,780 | B1 | * | 8/2004 | Neubecker | 340/456 |

FOREIGN PATENT DOCUMENTS

JP 07103330 A * 4/1995

* cited by examiner

*Primary Examiner*—David D Le
(74) *Attorney, Agent, or Firm*—Carlson, Gaskey & Olds PC

(57) ABSTRACT

A vehicle driveline control system includes monitoring when the transmission is in gear and the clutch is left open. If that condition exists for a selected amount of time, the controller provides an indication to the driver regarding the open clutch status. In one example, the controller alters the RPM rate of the engine to provide audible feedback to the driver. For example, the controller raises the engine RPM rate from an idle rate to a higher rate to simulate what the driver hears upon vehicle launch. A variety of indicators and control strategies may be used with a system designed according to this invention.

22 Claims, 2 Drawing Sheets

VEHICLE DRIVELINE CONTROL INCLUDING OPEN CLUTCH INDICATOR

BACKGROUND OF THE INVENTION

This invention generally relates to automated clutch control in a vehicle driveline. More particularly, this invention relates to providing a driver with an indication of an open clutch condition in such a vehicle driveline.

Vehicle transmissions and clutches are well known. In many vehicles where there are a relatively high number of available gear ratios in the transmission, relatively complex or challenging manual shifting sequences must be accomplished by a driver to successfully complete a shift between gears. For example, engine speed for synchronizing speeds between rotating shafts in the driveline must be controlled within certain tolerances to successfully complete a shift. For inexperienced drivers, such shifting may be challenging, difficult or impossible under some circumstances.

A variety of improvements over recent years have simplified the task of shifting such transmissions. Various functions have been automated to simplify the shifting process. For example, engine speed synchronization techniques automatically control engine speed to achieve the necessary speed synchronization so that a successful shift can be made. A variety of such techniques are known.

Other improvements include automated clutch actuators that remove the requirement for a driver to manually operate a clutch pedal to open or close a clutch. A variety of such clutch operators and control strategies are known.

One particular arrangement includes allowing the driver to select a desired starting gear and then automatically closing the clutch responsive to a launch command from the driver. Pressing the accelerator pedal may be one example launch command. One shortcoming of such a system is that it presents the possibility for the driver to leave the transmission in gear with the clutch open for an extended period of time. There are various reasons why such a condition should be prevented.

This invention provides a control strategy for avoiding leaving the clutch open under undesirable conditions, such as when the transmission is in gear.

SUMMARY OF THE INVENTION

In general terms, this invention is a system that determines that a clutch is left open for a relatively long time and alerts the driver of the open clutch condition.

One example system designed according to this invention includes a transmission having a plurality of gear ratios that can be selectively engaged. A clutch selectively couples the transmission to the vehicle engine. A controller determines whether the clutch is open and the transmission is in gear for at least a selected period of time when the vehicle is at rest. The controller provides an indication that the clutch is open when the selected time period has been exceeded.

In one particular example, the controller automatically alters an operation parameter of the vehicle engine to provide an audible open clutch indication. In one example, the controller raises an engine RPM rate from an idle rate to a higher RPM rate, which causes an audible change in the engine performance to alert the driver to the open clutch status. In one such example, the time period during which the clutch is open before this indication is given is zero seconds. In another example, the controller periodically and cyclically raises and lowers the engine RPM rate.

In another example, the controller provides at least one of a visible or audible indication to the driver indicating the open clutch status.

A method of this invention includes determining that the transmission is in gear and the clutch is open while the vehicle is at rest. After determining whether a selected time period has passed during which the transmission is in gear and the clutch is open, an open clutch indication is provided.

In one example, the method includes providing a prompt to a vehicle driver to generate a launch command, which corresponds to the driver's intent to drive the vehicle or to otherwise prompt the driver to change the current state of the vehicle transmission or clutch.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
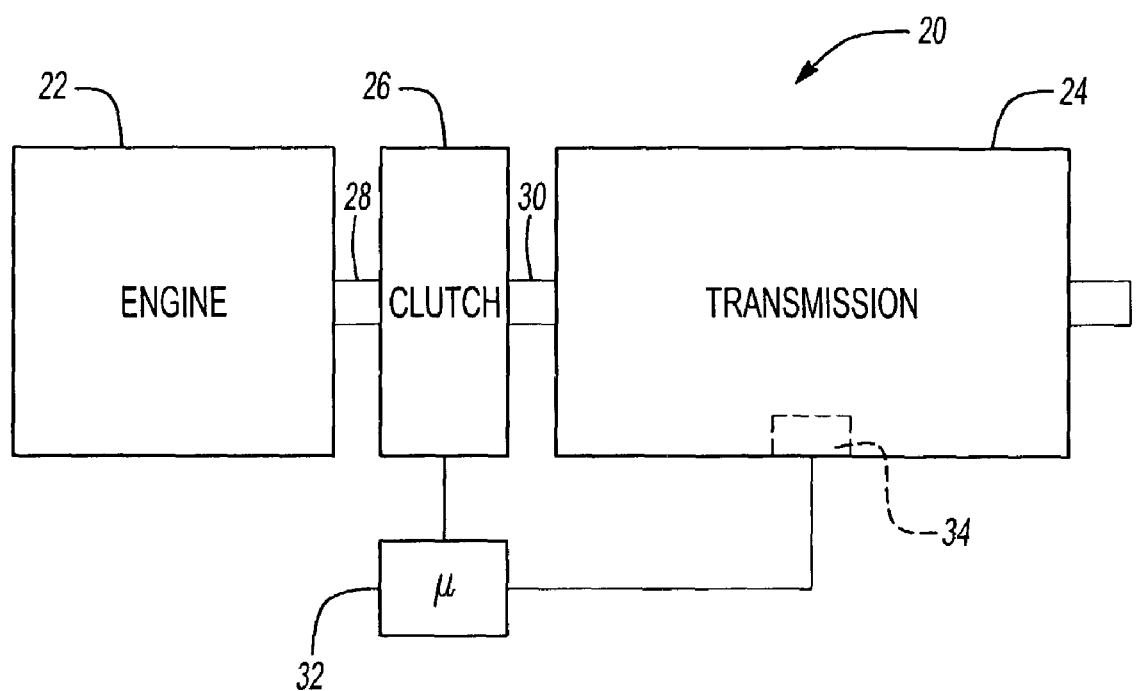
FIG. 1 schematically illustrates selected portions of the vehicle driveline that incorporates clutch monitoring according to this invention.

FIG. 1 schematically illustrates selected portions of a vehicle driveline system 20. An engine 22 provides driving torque to wheels (not illustrated) of the vehicle through a transmission 24. As known, the transmission 24 includes a plurality of gear members that are selectively engaged to provide a desired gear ratio between the engine and the vehicle wheels.

A clutch 26 selectively couples an output 28 from the engine 22 to an input shaft 30 of the transmission 24. A variety of known clutch configurations can be used as the clutch. A controller 32 automatically selectively controls the open or closed condition of the clutch 26 to achieve a desired engagement between the engine 22 and the transmission 24. The example controller 32 also controls the engine speed of the engine 22 in a known manner under selected conditions. The illustrated controller 32 also controls an automated mover 34 of the transmission 24 in a known manner for automatically shifting gears within the transmission 24.

Although a single controller 32 is schematically illustrated in FIG. 1, a plurality of controllers may be used (i.e., a dedicated engine controller, a dedicated clutch controller and a dedicated transmission controller) with appropriate communication between them as needed to achieve the results provided by this invention. Commercially available microprocessors or other controllers may be used as the controller 32. Those skilled in the art who have the benefit of this description will be able to select from among commercially available components to meet the needs of their particular situation. Similarly, those skilled in the art who have the benefit of this description will be able to develop the software code necessary to cause the controller of their particular system to perform the functions of the controller 32 from this description.

In one example, the vehicle is configured so that a driver may select a starting gear for launching the vehicle by moving a shift lever (not illustrated) for example. The controller 32 then places the driveline system 20 into a condition to be ready to launch the vehicle upon receiving a launch command from the driver. In one example, when the driver presses the accelerator pedal after selecting a starting gear, the controller 32 interprets that as a launch command and closes the clutch 26 so that driving torque is transmitted to the vehicle wheels through the transmission 24 as needed. Other arrangements may be provided for the driver to give a launch command.

According to this invention, the controller 32 is programmed to recognize when the vehicle is not moving, the clutch 26 is open and the transmission 24 is in gear. The controller is able to distinguish between an open clutch condition during a normal gear shift and an open clutch condition prior to launch. Information from the automated mover 34, for example, provides the controller 32 with an indication of the state of the transmission (i.e., in neutral or in gear).

The controller 32 determines when the clutch 26 is open and the transmission 24 is in gear. The controller 32 monitors this condition for a selected amount of time. When the selected time period has elapsed, the controller 32 determines that the clutch 26 has been open for an undesirably long period of time. The length of this time period may be chosen to suit the particular vehicle or components in a given situation. The controller 32 is programmed to provide an indication to the vehicle driver regarding the open clutch status once the selected time has expired. In one example, the time period is zero seconds, so that the controller immediately provides the indication to the driver once the in-gear and open clutch conditions exist.

Figure 2:
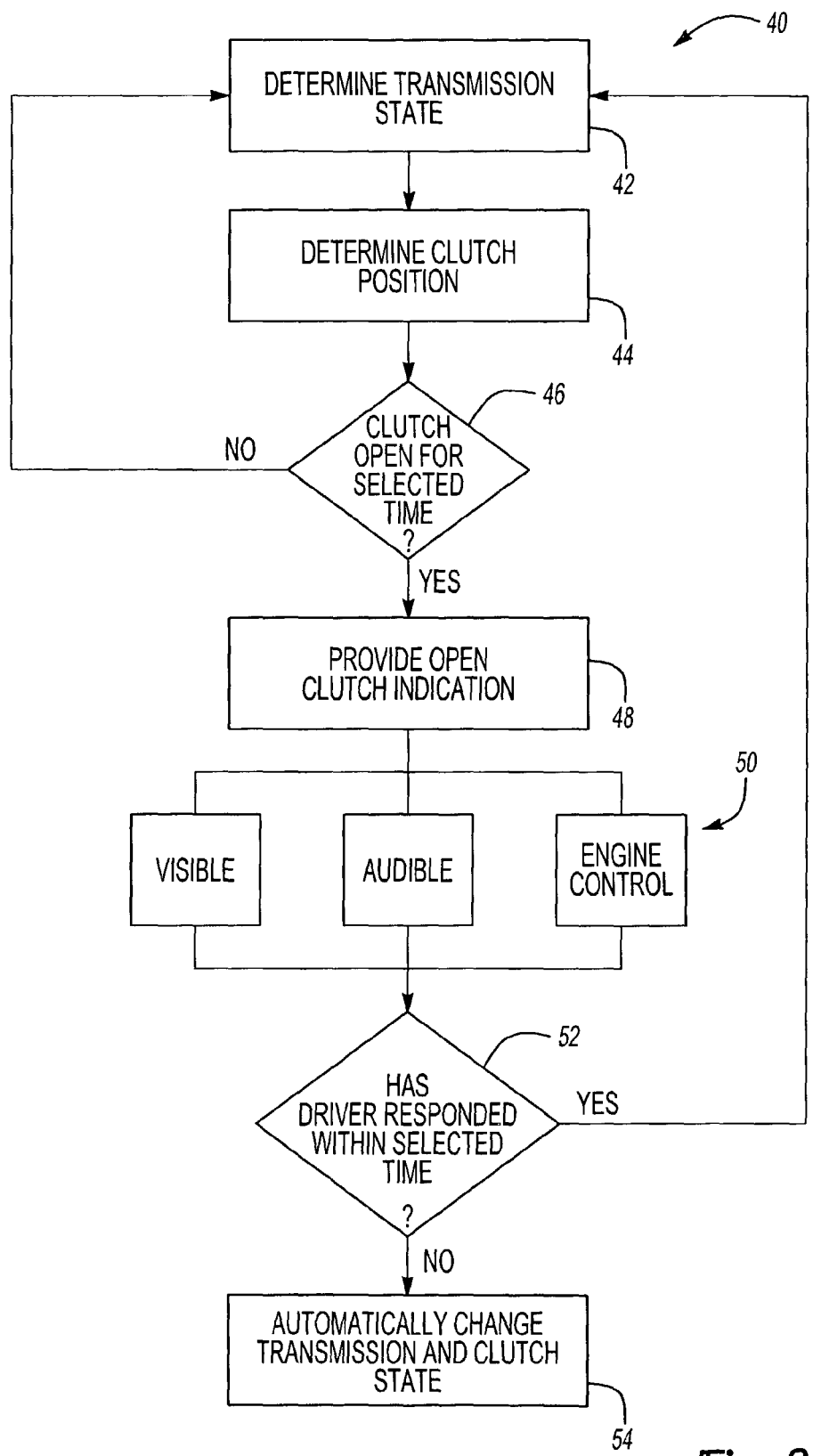
FIG. 2 is a flow chart diagram schematically illustrating an example implementation of a clutch monitoring strategy designed according to this invention.

FIG. 2 includes a flow chart diagram 40 that illustrates one particular implementation of a clutch monitoring strategy designed according to this invention. In this example, the controller 32 determines the transmission state at 42 and determines the clutch position at 44. The controller determines whether the clutch has been open while the transmission is in gear for the selected amount of time at 46. If the time elapses and the clutch remains open while the transmission is in gear, the controller provides an open clutch indication at 48.

The example of FIG. 2 includes three possible open clutch indicators at 50. The controller 32 may activate a visible indicator such as a warning light, an audible indicator that is heard within the vehicle driver compartment or the controller controls the engine to provide audible feedback to the driver. A variety of open clutch indicators may be used within the scope of this invention.

In one example, the controller changes the rotations per minute (RPM) rate of the engine to provide feedback to the driver regarding the open clutch condition. In one example, the controller 32 raises the engine RPM rate from an idle rate to a higher rate. Such a change simulates the sound heard by a driver when engaging a gear and launching a vehicle. This sound is designed to prompt the driver to think about whether launching the vehicle is desirable or to otherwise take action to address the open clutch condition. In one example, the controller immediately provides this indication once the clutch is open and the transmission is in gear. In other words, the time period of the step at 46 is zero seconds.

In one example, the controller 32 cyclically varies the engine RPM rate between selected values so that the changing RPM's provides discernible feedback to the vehicle driver indicating the open clutch status.

In one example, the controller 32 includes a portion that controls the speed of the engine 22 for purposes of speed synchronization during gear shifts. This same portion of the controller provides the ability to alter the engine RPM rate to provide the open clutch indication.

In the particular example illustrated in FIG. 2, the controller 32 determines whether the driver has responded to the open clutch indication within a selected time period that begins with the initiation of the open clutch indication. If the driver has taken some action (i.e., provided a launch command or moved the transmission to neutral), then the controller returns to determining when the transmission is in gear and the clutch is open so that the vehicle is ready for launch. If the driver does not respond within the selected amount of time, in the example of FIG. 2, the controller automatically changes the transmission or clutch state at 54. In one example, the controller 32 causes the transmission 24 to be automatically shifted into neutral. In one example, after shifting the transmission to neutral, the controller 32 automatically causes the clutch 26 to be closed. In another example, the controller 32 activates a second indicator such as a second warning light (not illustrated) within the driver compartment to provide a second warning level that a change in the engine, clutch or transmission state will be automatically affected by the controller 32 if the driver does not respond within an appropriate time.

This invention provides an indication to a driver that a clutch is left open and the transmission is left in gear for an undesirably or unusually long period of time. The invention avoids situations where the driver places the driveline in condition for vehicle launch (once the clutch is closed) without realizing that the driver has done so. This invention also alleviates potential damage to the components of the driveline that are affected by loads associated with leaving the clutch open for a long time.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A vehicle drive control system, comprising:
   a transmission having a plurality of gear ratios that can be selectively engaged;
   a clutch that selectively couples the transmission to an engine; and
   a controller that determines whether the clutch is open and the transmission is in gear prior to vehicle launch, the controller providing an indication that the clutch is open when the transmission is in gear and the clutch is open for at least a selected period, the Controller providing at least one of an audible or a visible open clutch indication to a driver.

2. The system of claim 1, wherein the controller determines whether the transmission is in a starting gear prior to vehicle launch.

3. The system of claim 1, wherein the controller automatically alters an operation parameter of the engine to provide the audible open clutch indication.

4. The system of claim 3, wherein the controller raises an engine RPM rate from an idle rate to a higher RPM rate.

5. The system of claim 3, wherein the controller causes the operation parameter to periodically oscillate between selected values.

6. The system of claim 5, wherein the controller cyclically raises and lowers an RPM rate of the engine.

7. The system of claim 1, wherein the controller automatically causes the transmission to be moved into neutral if the driver does not respond to the indication within a second selected period.

8. The system of claim 7, wherein the controller automatically causes the clutch to be closed after the transmission is in neutral.

9. The system of claim 1, wherein the clutch automatically closes responsive to a launch command.

10. The system of claim 9, wherein the launch command comprises pressing an accelerator pedal.

11. A method of controlling a clutch on a vehicle that has a transmission, a clutch and an automated clutch mover that selectively moves the clutch between an open and a closed position, comprising the steps of:
   determining that the transmission is in gear;
   determining that the clutch is open;
   determining whether a selected time period has passed during which the transmission is in gear and the clutch is open prior to vehicle launch; and
   providing at least one of an audible or a visible open clutch indication to a driver after the selected time period has passed.

12. The method of claim 11, including prompting the driver to generate a launch command corresponding to the driver's intent to drive the vehicle or to otherwise change a current state of the transmission or clutch.

13. The method of claim 11, including determining that the transmission is in a starting gear prior to vehicle launch.

14. The method of claim 11, including automatically altering an operation parameter of an engine to provide the audible open clutch indication.

15. The method of claim 14, including raising an RPM rate of the engine from an idle RPM rate to a higher RPM rate.

16. The method of claim 14, including periodically oscillating the operation parameter between selected values.

17. The method of claim 16, including cyclically raising and lowering an RPM rate of the engine.

18. The method of claim 11, including automatically moving the transmission into neutral if the driver does not respond to the open clutch indication within a second selected time period.

19. The method of claim 18, including automatically closing the clutch after the transmission is in neutral.

20. The method of claim 18, including providing a second indication to the driver if the driver does not respond within the second time period.

21. The method of claim 11, including automatically moving the clutch to a closed position responsive to a launch command provided by a driver.

22. The method of claim 21, including interpreting a pressing of an accelerator pedal as the launch command.

* * * * *